April 2, 1963 R. A. SCHOENFEIN 3,083,484

IDENTIFICATION CARD AND SUPPORT

Filed May 27, 1960

INVENTOR.
ROBERT A. SCHOENFEIN

BY

Boyken, Mohler & Wood

ATTORNEYS

United States Patent Office 3,083,484
Patented Apr. 2, 1963

3,083,484
IDENTIFICATION CARD AND SUPPORT

Robert A. Schoenfein, 725 Corbett Ave., San Francisco, Calif.

Filed May 27, 1960, Ser. No. 32,229
2 Claims. (Cl. 40—1.5)

This invention relates to an identification card, plate, badge, or the like, and to a support therefore and is a continuation in part of application serial No. 24,368, filed April 25, 1960, now abandoned.

For many years the employment of a card, badge, plate, and the like has been common at conventions, and in different organizations, and elsewhere to function as a means of identification. One of the most common expedients used is a card having the name or other identifying insignia thereon, and the card or sheet carrying the name or insignia may be enclosed in a transparent plastic cover, or carried in a holder with a pin attached or adapted to be attached to the card, cover or holder.

Where the pin is attached to the card, cover or holder, as a unit therewith the cost of manufacture and assembly is usually quite high, and the wearer must detach the pin each time the card, cover or holder is removed, and must reattach the same when the card, cover or holder is replaced. Also, in such instances the pins are difficult to attach without mutilating or injuring the card, and the like, or the garment to which pin is attached, which is particularly true where the card or identifying means is frequently removed and replaced.

In addition to the foregoing disadvantages, that occur with the present and heretofore available identifying devices, the pins are arranged or positioned so as to be objectionable for wearing by women whose garment to which the device is to be attached may be quite delicate or difficult to manipulate in applying a pin.

The employment of clips, buttons, and the like obviously restricts the use of the identifying means to a garment that has a lapel, buttonhole, or the like to which a clip or button may be attached.

One of the objects of the present invention is to provide an identifying device that overcomes the above-mentioned objections to conventional identifying means heretofore employed, and as above mentioned.

Another object of the invention is to provide an identifying device that is economical to make, easy to apply to any garment without injury thereto and that is inconspicuous and attractive and that is so formed and constructed that the card, plate or holder carrying the identifying insignia may be quickly and easily removed from the means that support it on a support or garment, and that may just as easily and quickly be reconnected with said means.

In explanation of the statement that the present invention provides a more attractive device than heretofore; the conventional identifying devices usually support the name or indicia bearing card, holder or the like at whatever angle the pin is secured to the garment, giving a relatively unattractive appearance.

With the present invention, the card or holder will normally be suspended for automatically swinging to a vertical position with the card upright irrespective of the angle at which the pin or attaching means is secured to the garment.

A still further object of the invention is the provision of a pin that may be as quickly attached to a garment as a conventional safety pin, and which pin and the identifying card to be carried thereby, have cooperating means enabling the card to be quickly suspended from the pin in a manner that will prevent accidental removal of the card from the pin.

Where identifying cards are in substantially constant use, and replacement of the card at intervals is desired, the present invention enables the replacement of cards without necessitating the replacement of the pin or attaching device. This is advantageous since the cards themselves may be sent through the mail in an ordinary envelope with danger of mutilating the envelope, as would be the case where the means for attaching the card must go along with the latter. Furthermore, with the present invention, the card such as a permanent pass or identification card may be of a size to be carried in a wallet or purse under ordinary circumstances of everyday use and used in conjunction with the supporting device at conventions or meetings, where it is to be displayed for a period of time.

Other objects and advantages will appear in the drawings and description.

Figure 1:
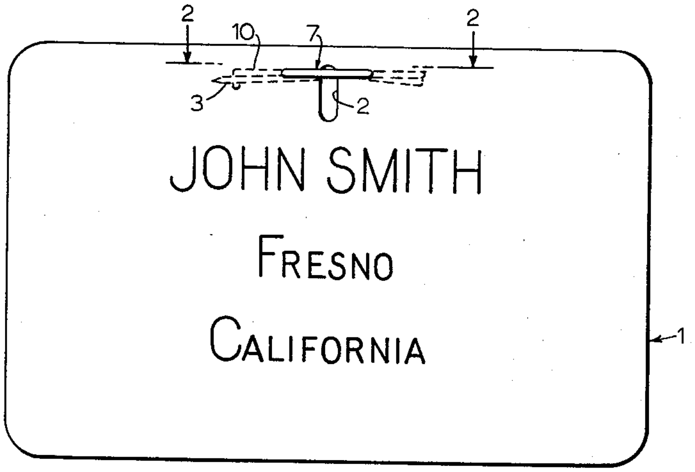
FIG. 1 is an enlarged front elevational view of a card on a pin.
Figure 4:
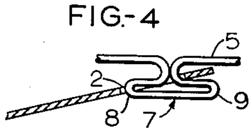
FIG. 4 is a sectional view taken along the line 4—4 of FIG. 3.

In detail, FIG. 1 shows a card 1 that may bear the name of a person, a number or any other information or identifying indicia. Along one marginal portion of the card, which is preferably the upper marginal portion, and centrally between the side edges of the card, a vertically elongated opening 2 may be formed. The edge of this opening at the upper end is preferably rounded, as shown in FIG. 4, but the particular contour is not essential to the successful operation of the invention.

Figure 2:
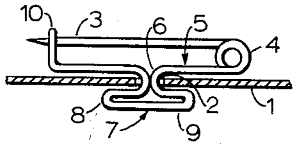
FIG. 2 is a sectional view taken along line 2—2 of FIG. 1.

FIG. 2 most clearly shows one form of card supporting means that may be used. This structure includes an elongated pin portion 3 that is pointed at one end thereof to facilitate thrusting it through the cloth of a garment on a person. The end of the pin opposite to its pointed end is extended laterally to form a return bend 4, and said return bend, in turn, is integral with an extension that extends alongside and spaced from portion 3 in the form of a bar generally designated 5.

The pin, return bend and bar 5 are preferably formed from spring wire of uniform diameter, and the bar 5 is bent to one side at a point substantially centrally between its ends to provide a laterally projecting shank 6, and a head 7, the latter being sections of the wire of bar 5 doubled on themselves to provide a head that is elongated in the same direction as the pin and the remainder of bar 5, and which head has end portions 8, 9 that extend oppositely outwardly from shank 6, but that are spaced from the bar 5 by shank 6. The length of at least one end portion 8, 9 from the shank outwardly, and preferably either end portion, plus the thickness of the shank in the direction in which head 7 extends is substantially equal to, and not more than the length of opening 2.

Figure 3:
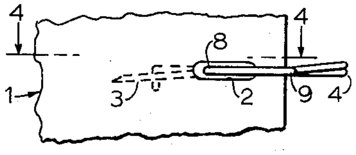
FIG. 3 is a fragmentary front elevational view showing the card in the step of either positioning it on the pin or removing it from the latter.

Assuming the pin 3 is inserted in a garment, and is substantially horizontal, it will be seen that head 7 also extends horizontally. If the card is separate from the pin, in order to attach it to said pin the card is turned, as seen in FIGS. 3, 4 so that either end 8, or 9 extends through the opening 2 to the shank. In FIG. 4 the end portion 9 has been inserted through opening 2 to shank 6, and at this point the other portion 8 will be in register with the opening 2 and will step through the latter. By merely releasing the card after the head 7 is through the opening, the latter will automatically swing to a vertical position as seen in FIG. 1, with the head 7 extending at right angles to the opening 2 and in which position the end portions 8, 9 will extend over the face of the card 1 along each of the opposite vertical edges of opening 2, and the card cannot be removed from the pin without swinging it so that the head will be again aligned with the opening 2. The card may then be removed only when in the position seen in FIG. 4.

As mentioned before, it is immaterial whether end portion 8 or 9 is first inserted through opening 2 or which end portion is first removed through said opening. However, when the card is suspended at the upper edge of opening 2 from shank 6 it will automatcially swing to vertical, hence it is not important whether the pin is exactly horizontal, so long as it extends generally horizontal.

Also, as seen in FIG. 4, it is desirable that the opening 2 be sufficiently close to the edge of the card so that the head 7 can be slipped through the opening free from interference between the portion of the card that is between the upper end of the opening 2 and the bar 5. For that reason, and to insure adequate strength in the portion of the card between said opening and the edge of the card adjacent thereto, and also to permit relatively free universal swinging of the card, the shank 6 should have greater length than the thickness of the card and so that head 7 will be spaced a substantial distance from the bar 5.

The bar 5 at the end thereof that is opposite to the return bend 4 may be bent to form a generally U-shaped catch 10 (FIG. 1) for the pointed end portion of pin 6. Any suitable catch, such as in a conventional safety pin, or a rotary catch as on bar pins may be used, since the exact form of the catch itself is not material. The catch illustrated is perhaps the cheapest form of catch where a catch is employed.

Also it should be noted that whether the return bend 4 is double to form a complete loop, as in a conventional safety pin, or is merely a plain single return bend, is not material to the invention, although here again, the single bend would be the most economical to make. Exactly what form the catch or return bend may take depends greatly upon the length of time the identification device is to be used and the treatment it is expected to receive. Manufacturing considerations, such as feasability for commercial production, and economy, will dictate whether the head 7 and shank 6 are formed integrally with the pin portion 3 and with each other, or are formed separately and then secured together.

The employment of a horizontal pin and a horizontal head is usually the preferred form for several reasons, one of which is that where the pin 3 is inserted horizontally through a garment, it provides two spaced points for supporting the load of the card, and this is a desirable feature where the cards are used by women and the garment is relatively thin, fragile, or of delicate material that would be drawn downwardly and be likely to distort or injure the garment where a single load carrying point provided, such as where a pin is vertical.

The employment of the vertical opening is more desirable than a horizontal opening, since the card will be suspended from the upper end of the opening and will swing to a balanced position, irrespective of movements of the wearer or whether the pin itself is in an exact horizontal position.

Also, as seen in FIG. 1, the pin itself is concealed by the card, and even when the card is removed all that is seen is the bar 5 and head 7, which are not unsightly, and are inconspicuous.

At conventions, or where the card may be a pass or other identifying means that is frequently removed and replaced, it is obvious that the frequent insertion and withdrawal of a pin not only would detrimentally affect the fabric of the garment but the operation is troublesome, and the hazard of pricking the fingers is present with each insertion and removal of the pin.

With the present invention, the pin may stay in the garment, and the card can be removed and placed in the pocket or in the case of a woman, in her purse, and then replaced on the pin when desired.

Furthermore, with the present structure, no detrimental fixed strain is placed on the garment. Nor does the bearer's activity place a strain on the card or on the attaching device. Strains from different causes, including the above, heretofore frequently have resulted in injury to the garment carrying the card, or in injury to the card, or both. Such injury is avoided by the present structure that permits substantial universal swinging of the card relative to the supporting device.

Figure 5:
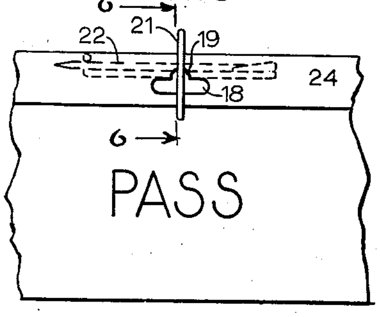
FIG. 5 shows an elevational view of a modified form of the invention.

In FIG. 5 the opening 18 extends horizontally and the upper edge thereof is formed with a notch 19 (FIG. 5) in which shank 26 of the pin (FIG. 6) may be positioned when the head 21 of the pin is inserted through the opening.

When the opening 18 extends horizontally, and the pin 22 is also horizontal, as seen in FIG. 5, the head 21 extends vertically so that the head extends at right angles to the opening to prevent accidental removal of the card. The only difference between the pin of FIGS. 5, 6 and that of FIGS. 1, 2 is that the head is twisted or to extend vertically instead of horizontally.

The horizontal opening is used only where, as here, a vertical opening is not feasible or desirable. In FIG. 5 a frame 24 holds the card and it is not sufficiently wide for a vertical opening. In certain other instances, the printing or other features may make the vertical opening undesirable, and in these instances the horizontal opening is used.

Figure 7:
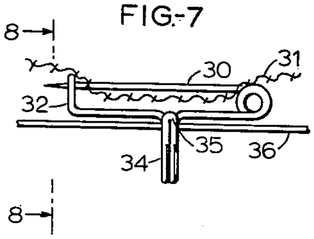
FIG. 7 is an enlarged top plan view of a slightly modified form of the invention in which the opening is circular, and the fabric to which the pin is attached is shown in cross-section.
Figure 8:
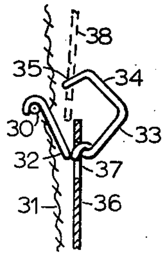
FIG. 8 is a sectional view taken along line 8—8 of FIG. 7.

The form of the invention shown in FIGS. 7, 8 shows a pin similar to that of FIG. 1, having a pin portion 30 that is pointed at one end to facilitate insertion of the portion 30 into and through the fabric designated 31. The end of the portion 30 opposite to the pointed end may be continued in the form of a return bend that is extended to form a bar portion 32. The latter, in turn, may be centrally doubled on itself and extended laterally to form a generally V-shaped portion, having legs 33, 34 forming the V, and in which leg 33 connects at one end with bar 32, while the corresponding end of the other leg is bent generally toward the bar 32 to provide an end portion 35.

When the pin is on the garment and the safety catch, similar to portion 10 in FIG. 2, is engaged with the pin portion, the leg 33 will extend slantingly upwardly and outwardly from the fabric 31 to the apex of the V, where it joins the other leg 34. The other leg 34 extends slantingly upwardly over leg 33 and the upper end portion 35 slants downwardly toward and will be quite close to the fabric 31, but with space to readily insert the card 36 between the outer end of portion 35 and the fabric.

The card 36 is formed with a circular opening 37, the diameter of which, preferably, is substantially equal to the vertical distance between the terminating end of end portion 35 and the bend where said end portion connects with leg 34.

The opening 37 is relatively close to the upper edge of card 36 centrally between the side edges of the card where the card is oblong in shape. In any event, the opening is preferably in such a position that the card will be suspended so that any letters or members on the face of the card will be vertical or upright in correct reading position when the card is suspended from the upper edge of the opening 7.

In operation, to suspend the card from the V-shaped portion, the card is positioned vertically, upside down, with the face carrying any insignia to be read facing the garment above the pin. The card is then lowered until the opening 37 is between the fabric and the end portion 35 as seen in dotted lines at 38 (FIG. 8) and then the card is moved away from the fabric to cause the end portion 35 to pass through opening 37, after which the uppermost edge (lower edge of card when suspended) is swung outwardly and downwardly and upon release of the card it will be suspended vertically from the lower end of leg 33 against the fabric 31, or substantially against the latter.

When in suspended position, the end portion 35 will extend over and across the upper edge of the card, so even where opening 36 is relatively large, a direct upward movement of the card will result in portion 35 preventing accidental removal of the card from the V-shaped portion from which it is suspended. In other words, to remove the card, the operation described for attaching the card must be substantially reversed.

Figure 6:
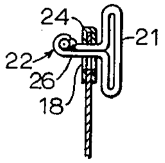
FIG. 6 is a sectional view taken along line 6—6 of FIG. 5.

The leg 33 in FIG. 8 corresponds, in function, with the shank 6 of FIG. 2 and the card must be rotated or revolved relative to the axis of said shank through a substantial angle of approximately 90° in the case of FIGS. 1 and 6 or approximately 180° in the case of FIG. 7 to release the card, and in all forms of the invention, an extension of the shank extends over the face of the card when the card is suspended from the shank in order to hold the card on the shank.

In the case of FIGS. 7, 8, it is important that the card be suspended from the pin substantially against the fabric, yet which card may have a substantially universal swinging movement during the movement of the body of the wearer. Also the retaining end portion 35 is important in preventing accidental removal of the card while permitting easy removal of the card, and easy attaching of the card, when desired.

It should be emphasized that the present invention does not require a holder or carrying means to which a fastener is attached. Heretofore, the use of the carrier, or holder for the card, such as a transparent sleeve or envelope, has been to provide a means for connecting the card to the attaching device, one example of which is a pin. The cost of such envelope, sleeve, or the like is an added and unnecessary expense that is eliminated where the present invention is employed.

The use of the word "card" in the claims is included to cover a card, badge, pass, plate or the like, whether or not enclosed in a protective covering.

I claim:

1. In a support for an identification card having an opening formed in one marginal portion thereof, and which support includes a generally safety type of pin having a horizontally elongated pin portion adapted to be pinned to a garment and a horizontally elongated extension alongside said pin portion spaced therefrom, which pin portion and extension are connected at one of their ends by a return bend, and are releasably connected at their opposite ends by a retainer on said extension, the improvement that comprises:

(*a*) an elongated card supporting and card retaining member rigid with said extension at a point approximately midway between the ends of said extension, and which member is adapted to extend through an opening in the marginal portion of an identification card, (*b*) said member extending angularly outwardly and upwardly to the side of said extension that is opposite to said pin portion and terminating in an end portion that is spaced above and extends generally toward said pin portion and said extension, (*c*) said member including its angularly outwardly and upwardly extending portion and said terminating end portion being disposed in a plane substantially normay to said pin portion and said extension.

2. In combination with an identification card having an opening formed in the upper marginal portion thereof:

(*a*) a support for said card having (*b*) a horizontally elongated pin portion adapted to be pinned to a garment, (*c*) a horizontally elongated extension alongside said pin portion spaced from said pin portion, (*d*) a return bend portion integrally connecting said pin portion and said extension at one of their ends, (*e*) a retainer on said extension at the end thereof opposite to said return bend portion releasably engageable with said pin portion for securing said pin portion against removal from such garment, (*f*) an elongated card supporting and retaining member carried by said extension at a point thereon approximately midway between said return bend and said retainer, (*g*) said member projecting outwardly from said extension relative to said pin portion and terminating in an end portion spaced above and extending generally toward said pin portion, (*h*) said member including its said end portion being disposed in a vertical plane perpendicular to the lengths of said pin portion and said extension, said member extending through said opening in said card with said end portion of said member spaced above said card and the relative thickness of said member and the size of said opening being such that said card is swingingly suspended from said member and may be removed from said member upon swinging said card upwardly above said member and then moving the card longitudinally of said terminating end portion.

References Cited in the file of this patent

UNITED STATES PATENTS

| | | |
|---|---|---|
| 143,364 | Marston | Sept. 30, 1873 |
| 785,479 | Denagger | Mar. 21, 1905 |
| 879,493 | Robinson | Feb. 18, 1908 |
| 1,330,599 | Magid | Feb. 10, 1920 |
| 2,357,231 | Sleeper | Aug. 29, 1944 |
| 2,455,007 | Hayslip | Nov. 30, 1948 |

FOREIGN PATENTS

| | | |
|---|---|---|
| 18,428 | Great Britain | Aug. 27, 1898 |
| 262,048 | Switzerland | Sept. 16, 1949 |